United States Patent
Koifman

(10) Patent No.: US 12,335,641 B2
(45) Date of Patent: Jun. 17, 2025

(54) IMAGE SENSOR WITH HIGH DYNAMIC RANGE AND LOW NOISE

(71) Applicant: Apple Inc., Cupertino, CA (US)

(72) Inventor: Vladimir Koifman, Rishon Lezion (IL)

(73) Assignee: Apple Inc., Cupertino, CA (US)

( * ) Notice: Subject to any disclaimer, the term of this patent is extended or adjusted under 35 U.S.C. 154(b) by 193 days.

(21) Appl. No.: 18/322,629

(22) Filed: May 24, 2023

(65) Prior Publication Data

US 2024/0089623 A1    Mar. 14, 2024

Related U.S. Application Data

(60) Provisional application No. 63/406,268, filed on Sep. 14, 2022.

(51) Int. Cl.
*H04N 25/616* (2023.01)
*H04N 25/709* (2023.01)
*H04N 25/78* (2023.01)

(52) U.S. Cl.
CPC ......... *H04N 25/616* (2023.01); *H04N 25/709* (2023.01); *H04N 25/78* (2023.01)

(58) Field of Classification Search
None
See application file for complete search history.

(56) References Cited

U.S. PATENT DOCUMENTS

| | | | |
|---|---|---|---|
| 5,144,442 | A | 9/1992 | Ginossar et al. |
| 6,570,617 | B2 | 5/2003 | Fossum et al. |
| 8,169,517 | B2 | 5/2012 | Poonnen et al. |
| 8,606,009 | B2 | 12/2013 | Sun |

(Continued)

FOREIGN PATENT DOCUMENTS

| | | |
|---|---|---|
| DE | 102021209943 A1 | 3/2022 |
| EP | 2123019 B1 | 9/2019 |

(Continued)

OTHER PUBLICATIONS

Shukri, "Apple's Newest iPhone Three Camera System is "Campacked"," Image Sensors Technology, TechInsights Inc., pp. 1-10, year 2023.

(Continued)

*Primary Examiner* — Mark T Monk
(74) *Attorney, Agent, or Firm* — Meitar Patents Ltd.; Daniel Kligler

(57) ABSTRACT

An image sensor includes a logic die, including column readout circuits, and a sensor die, overlaid on the logic die and including bitlines connected to the column readout circuits and an array of detector elements. Each detector element includes a photodiode having cathode and anode terminals and a floating diffusion node connected to one of the terminals of the photodiode. A first reset transistor is coupled between the floating diffusion node and a reset voltage. A source follower transistor has an input connected to the floating diffusion node and an output connect to a first terminal of an output capacitor having first and second terminals, with the first terminal. A second reset transistor is coupled between a second terminal of the output capacitor and the reset voltage. A select transistor is coupled between the second terminal of the output capacitor and one of the bitlines.

20 Claims, 5 Drawing Sheets

(56) References Cited

U.S. PATENT DOCUMENTS

| | | | |
|---|---|---|---|
| 9,344,635 | B2 | 5/2016 | Vogelsang et al. |
| 9,571,774 | B2 | 2/2017 | Koifman et al. |
| 10,250,832 | B1 | 4/2019 | Xu et al. |
| 10,798,322 | B2 | 10/2020 | Smith et al. |
| 10,859,434 | B2 | 12/2020 | Panicacci |
| 11,336,860 | B2 | 5/2022 | Yonemoto |
| 2014/0159702 | A1 | 6/2014 | Doege |
| 2016/0240572 | A1 | 8/2016 | Koifman et al. |
| 2016/0269661 | A1 | 9/2016 | Hseih et al. |
| 2017/0118430 | A1 | 4/2017 | Koifman et al. |
| 2018/0227516 | A1* | 8/2018 | Mo ............... H01L 27/14605 |
| 2018/0227523 | A1 | 8/2018 | Mo et al. |
| 2020/0382726 | A1 | 12/2020 | Inaoka et al. |
| 2023/0011827 | A1 | 1/2023 | Cho et al. |

FOREIGN PATENT DOCUMENTS

| | | | |
|---|---|---|---|
| KR | 20200098764 | A | 8/2020 |
| WO | 2023018841 | A9 | 2/2023 |

OTHER PUBLICATIONS

Spivak et al., "Wide-Dynamic-Range CMOS Imaging Devices—Comparative Performance Analysis", IEEE Transactions on Electron Devices, vol. 56, No. 11, pp. 2446-2461, Nov. 2009.
Wikipedia, "Internet of Things (IoT)," pp. 1-53, latest edit Apr. 18, 2023.
Robidoux et al., "End-to-end High Dynamic Range Camera Pipeline Optimization," Conference Paper, Conference on Computer Vision and Pattern Recognition (CVPR) 2021, pp. 1-11, year 2021.
Ernst et al., "HDR+ with Bracketing on PixelPhones," Blog, Google Research, pp. 1-8, Apr. 23, 2021, as downloaded from as downloaded from https://blog.research.google/2021/04/hdr-with-bracketing-on-pixel-phones.html.
Koifman, U.S. Appl. No. 18/335,157, filed Jun. 15, 2023.
Koifman, U.S. Appl. No. 18/337,001, filed Jun. 18, 2023.
Panicacci et al., U.S. Appl. No. 18/353,085, filed Jul. 16, 2023.
Theuwissen, "CMOS Image Sensors: State-of-the-Art," Solid-State Electronics, vol. 52, pp. 1401-1406, year 2008.

* cited by examiner

IMAGE SENSOR WITH HIGH DYNAMIC RANGE AND LOW NOISE

CROSS-REFERENCE TO RELATED APPLICATION

This application claims the benefit of U.S. Provisional Patent Application 63/406,268, filed Sep. 14, 2022, which is incorporated herein by reference.

FIELD OF THE INVENTION

The present invention relates generally to optoelectronic devices, and particularly to image sensors.

BACKGROUND

The large majority of image sensors currently in use are CMOS (complementary metal-oxide-semiconductor) active-pixel sensor (APS) monolithic arrays, with 4 T pixels. In these devices, each detector element (referred to as a "pixel") comprises a photodiode, a floating diffusion, and four CMOS transistors, including a transfer gate, reset gate, selection gate, and source-follower readout transistor. The transfer gate controls charge transfer from the photodiode to the floating diffusion and enables noise reduction by correlated double sampling (CDS). Image sensors using 3 T pixels, without the transfer gate, are easier to fabricate and less prone to artifacts, but generally suffer from higher noise.

SUMMARY

Embodiments of the present invention that are described hereinbelow provide improved image sensors and methods for producing and controlling such image sensors.

There is therefore provided, in accordance with an embodiment of the invention, an image sensor, which includes a logic die, including column readout circuits, and a sensor die, overlaid on the logic die and including bitlines connected to the column readout circuits and an array of detector elements. Each detector element includes a photodiode having cathode and anode terminals and a floating diffusion node connected to one of the terminals of the photodiode. A first reset transistor is coupled between the floating diffusion node and a reset voltage. A source follower transistor has an input connected to the floating diffusion node. An output capacitor has first and second terminals, with the first terminal connected to an output of the source follower transistor. A second reset transistor is coupled between the second terminal of the output capacitor and the reset voltage. A select transistor is coupled between the second terminal of the output capacitor and one of the bitlines.

In a disclosed embodiment, each detector element includes a bias transistor, coupled to apply a supply voltage to the first terminal of the output capacitor. Additionally or alternatively, each detector element includes an additional source follower transistor coupled between the second terminal of the output capacitor and the select transistor.

In some embodiments, each detector element includes a lateral overflow integration capacitor (LOFIC) circuit, including one or more charge storage capacitors and one or more LOFIC transistors coupled between the floating diffusion node and the charge storage capacitors, wherein the first reset transistor is coupled between the LOFIC circuit and the reset voltage. In the disclosed embodiments, the LOFIC circuit includes a first charge storage capacitor having a first capacitance, a second charge storage capacitor having a second capacitance greater than the first capacitance, a first LOFIC transistor connected between the floating diffusion node and a first charge input terminal of the first charge storage capacitor, and a second LOFIC transistor connected between the first charge input terminal of the first charge storage capacitor and a second charge input terminal of the second charge storage capacitor. In one embodiment, the first reset transistor is connected between the second charge input terminal of the second charge storage capacitor and the reset voltage. Additionally or alternatively, during readout of the detector element to the bitline, the first and second LOFIC transistors are switched on sequentially while the select transistor is switched on.

In some embodiments, during each image frame, the first reset transistor is switched on at a first reset time to reset the floating diffusion node prior to an exposure period of the frame, the select transistor is switched on at a first select time, following the exposure period, so as to read out photocharge from the floating diffusion node, the first reset transistor is switched on at a second reset time, following the first select time, to reset the floating diffusion node, and the select transistor is switched on at a second select time, following the second reset time, to read out noise accumulated by the detector element. In a disclosed embodiment, the second reset transistor is switched on to reset the output capacitor between the first reset time and the first select time. Optionally, the second reset transistor is switched on to reset the output capacitor between the second reset time and the second select time.

There is also provided, in accordance with an embodiment of the invention, a method for image sensing, which includes providing a logic die, including column readout circuits, and overlaying on the logic die a sensor die including an array of detector elements and bitlines, which connect to the column readout circuits on the logic die. Each detector element includes a photodiode having cathode and anode terminals, a floating diffusion node connected to one of the terminals of the photodiode, a first reset transistor coupled between the floating diffusion node and a reset voltage, a source follower transistor having an input connected to the floating diffusion node, an output capacitor having first and second terminals, with the first terminal connected to an output of the source follower transistor, a second reset transistor coupled between the second terminal of the output capacitor and the reset voltage, and a select transistor coupled between the second terminal of the output capacitor and one of the bitlines.

The present invention will be more fully understood from the following detailed description of the embodiments thereof, taken together with the drawings in which:

DETAILED DESCRIPTION OF EMBODIMENTS

Embodiments of the present invention that are described herein provide image sensors comprising 3 T pixels of a novel design that achieves high dynamic range with low noise and without the artifacts that can occur in conventional 4 T pixel arrays. The 3 T pixels include a lateral overflow integration capacitor (LOFIC) circuit to enable sensing over a wide range of lighting conditions, from indoors to bright sunlight, without automatic exposure control. An in-pixel capacitor and additional reset transistor, following the source-follower transistor, enables suppression of kTC noise using CDS.

Although the in-pixel capacitor and additional reset transistor are particularly useful in conjunction with the LOFIC circuit, in alternative embodiments the in-pixel capacitor and additional reset transistor can be used to reduce noise in other image sensor pixels even without a LOFIC circuit.

Figure 1:
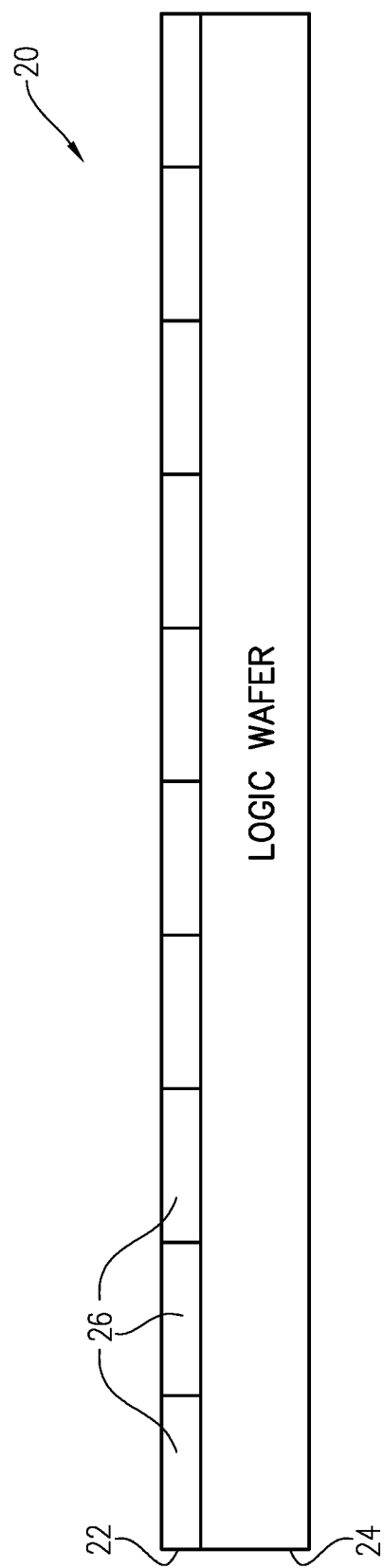
FIG. 1 is a schematic side view of an image sensor, in accordance with an embodiment of the invention.
Figure 2:
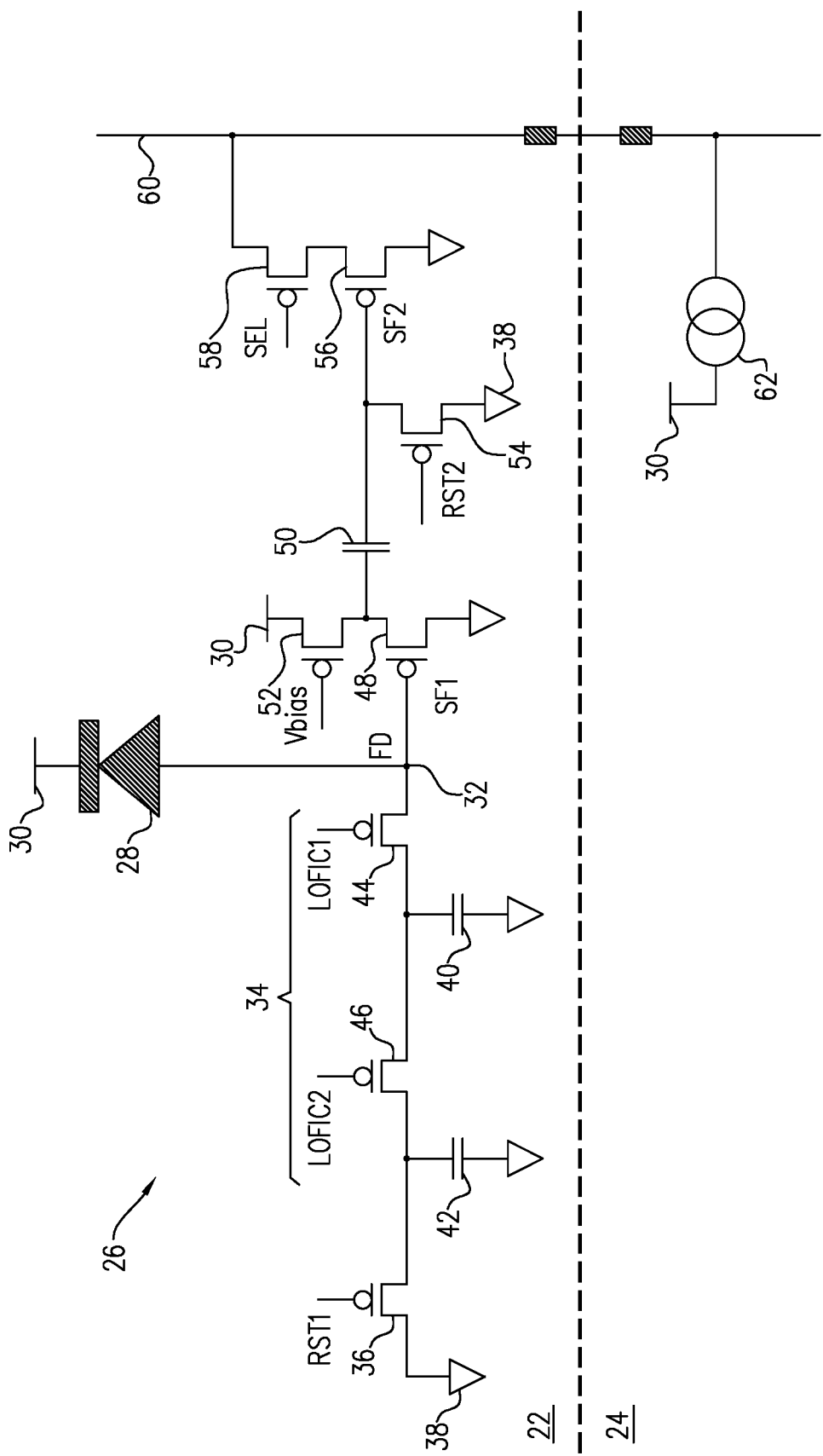
FIG. 2 is a schematic circuit diagram showing details of a detector element in an image sensor, in accordance with an embodiment of the invention.

FIG. 1 is a schematic side view of an image sensor 20, in accordance with an embodiment of the invention. Image sensor 20 comprises a logic die 24, made from a first silicon wafer, and a sensor die 22, made from a second silicon wafer, overlaid on logic die 24. Sensor die 22 comprises an array of detector elements 26, also referred to as pixels, which are connected by bitlines to column readout circuits (as shown in FIG. 2). The stacked wafer configuration of image sensor 20 makes it possible to use standard CMOS control and readout circuits in logic die 24, while detector elements 26 may be fabricated by a different process. Alternatively, sensor die 22 may comprise another semiconductor material, rather than silicon.

Figure 4:
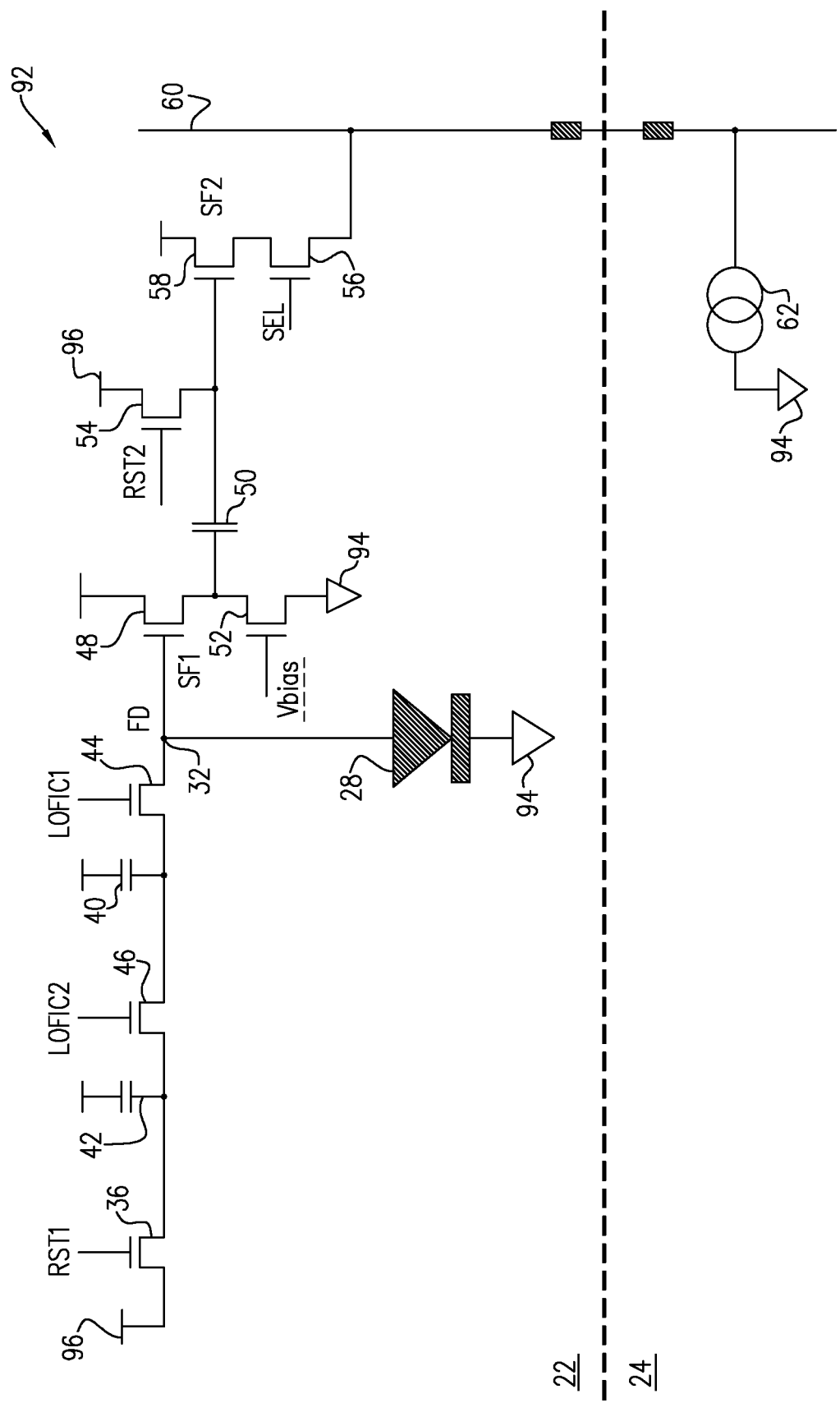
FIG. 4 is a schematic circuit diagram showing details of a detector element in an image sensor, in accordance with an alternative embodiment of the invention.

FIG. 2 is a schematic circuit diagram showing details of one of detector elements 26, in accordance with an embodiment of the invention. Detector element 26 is shown in FIG. 2 as comprising P-channel MOSFET transistors and a P-on-N photodiode (PD) 28. Alternatively, detector elements 26 may comprise N-channel transistors and N-on-P photodiodes, as shown in FIG. 4. Photodiode 28 and other components of detector element 26 are connected to a supply voltage 30, for example 1.5 V, 1.2 V, or 1.0 V. There is no need in this design for boosting voltages above the supply voltage.

Detector element 26 comprises a floating diffusion node (FD) 32 connected to one of the terminals of photodiode 28 (in this case to the anode, with the cathode connected to the supply voltage). A lateral overflow integration capacitor (LOFIC) circuit 34 is coupled to floating diffusion node 32, and a first reset transistor (RST1) 36 is coupled between LOFIC circuit 34 and a reset voltage 38 (which is taken to be the ground voltage in the pictured example).

LOFIC circuit 34 in the present example comprises two charge storage capacitors 40, 42 and two LOFIC transistors (LOFIC1 and LOFIC2) 44, 46 coupled in series to floating diffusion node 32. The first LOFIC transistor (LOFIC1) 44 connects the floating diffusion node to the charge input terminal of the first charge storage capacitor 40, which has a relatively small capacitance, for example about 20 fF in the pictured example. The second LOFIC transistor 46 connects the charge input terminal of this first charge storage capacitor 40 to the charge input terminal of the second charge storage capacitor 42, which has a larger capacitance, for example about 500 fF. In this configuration, floating diffusion node 32 itself will be used to store and read out photocharge in low-light conditions; charge storage capacitor 40 will be used to store and read out photocharge in intermediate conditions; and charge storage capacitor 42 will be used to store and read out photocharge in conditions of bright light. This LOFIC configuration enables detector element 26 to sense light over a dynamic range of about 120 dB. Alternatively, other LOFIC configurations may be used, with smaller or larger numbers of capacitors and transistors.

A source follower transistor (SF1) 48 has its gate connected to receive a charge input from floating diffusion node 32 and its drain connected to the input terminal of an output capacitor 50, which is used in correlated double sampling (CDS). It is desirable that capacitor 50 have a large capacitance, for example 100 fF, in order to zero the kTC noise of floating diffusion node 32. A bias transistor 52 is connected to apply the supply voltage to the input terminal of output capacitor 50 when a control signal (Vbias) is applied to the gate of the bias transistor. Bias transistor 52 typically draws a current, when switched on, in the range of 0.1 nA to 10 nA. A second reset transistor (RST2) 54 is coupled between the output terminal of output capacitor 50 and reset voltage 38.

The gate of an additional source follower transistor (SF2) 56 is connected to the output terminal of output capacitor 50, while the drain of this source follower is connected to a select transistor (SEL) 58. When select transistor 58 is turned on, it outputs a signal from detector element 26 to a bitline 60 serving a column of the array of detector elements. As noted above, bitline 60 connects detector elements 26 in sensor die 22 to a column readout circuit 62 in logic die 24. Bitline 60 operates at a source line voltage (VSL) supplied by the readout circuit, for example 1.5 V, and typically draws a current of about 1 pA.

Figure 3:
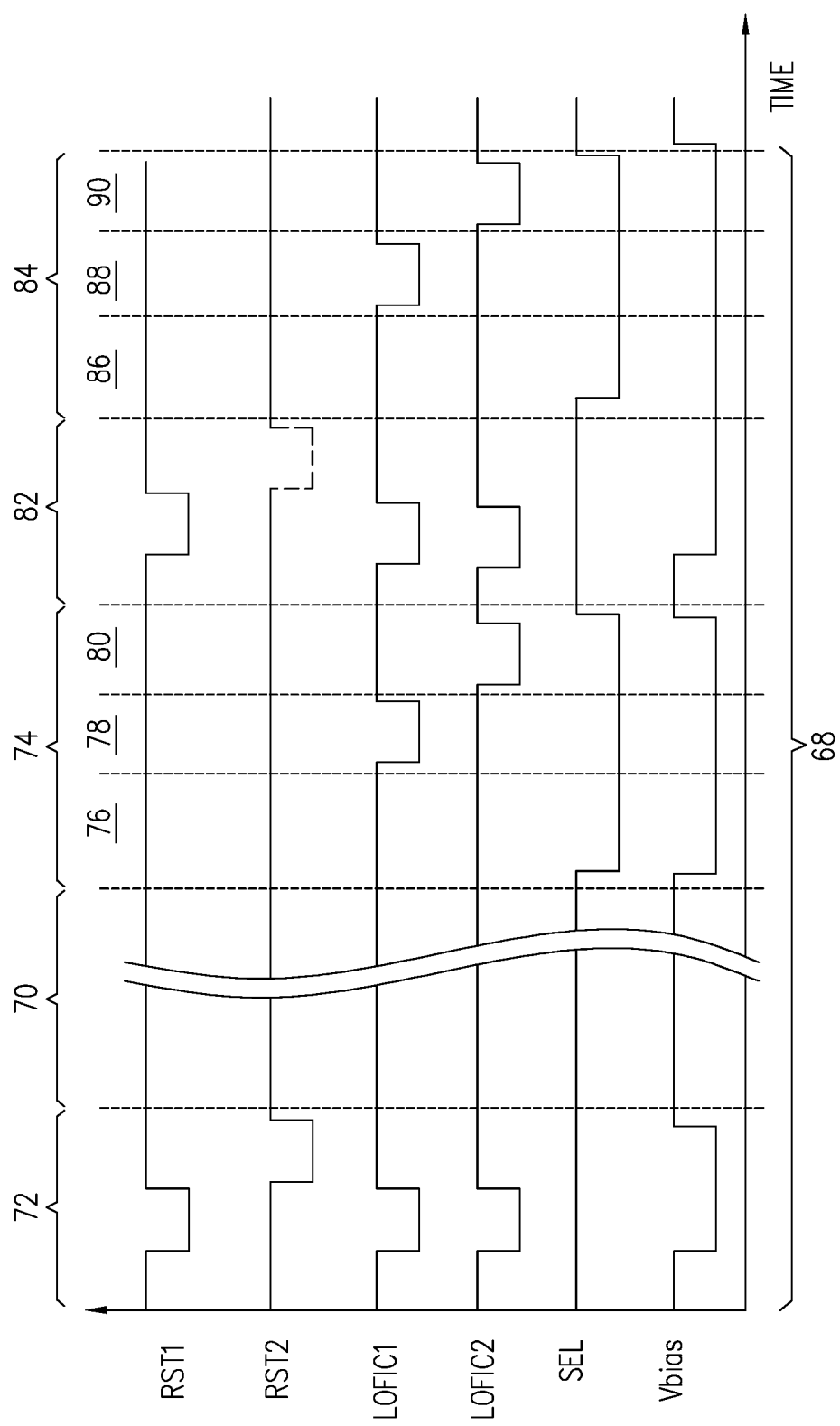
FIG. 3 is a timing diagram that schematically shows signals applied to the transistors of the detector element of FIG. 2, in accordance with an embodiment of the invention.

FIG. 3 is a timing diagram that schematically shows signals applied to transistors 36, 54, 44, 46, 58, and 52 of detector element 26 in the course of a single image frame 68, in accordance with an embodiment of the invention.

Each image frame 68 includes an exposure time 70, for example in the range of 1-10 ms, during which photocharge from photodiode is collected at floating diffusion node 32 and possibly on one or both of the LOFIC charge storage capacitors 40, 42, depending on the intensity of the incident light. In a pre-exposure reset interval 72 prior to exposure period 70, the two reset transistors (RST1 and RST2) 36 and 54 are switched on in sequence to reset floating diffusion node 32 and to reset output capacitor 50. LOFIC transistors 44, 46 are also switched on together with RST1 to reset LOFIC charge storage capacitors 40, 42.

Following exposure period 70, select transistor 58 is switched on during a signal readout period 74 to read out photocharge from floating diffusion node 32 to bitline 60. Readout period 74 comprises a high-gain interval 76, followed by a medium-gain interval 78 and then a low-gain interval 80. While select transistor 58 is switched on, the charge on floating diffusion node 32 is first read out during high-gain interval 76. LOFIC transistors 44 and 46 are then switched on sequentially during medium-gain interval 78 and low-gain interval 80 to read out the photocharge stored in LOFIC charge storage capacitors 40 and 42 to bitline 60.

After all photocharges have been read out, reset transistor (RST1) 36 is switched on for a second time in a post-exposure reset period 82, together with LOFIC transistors 44, 46, to reset floating diffusion node 32 and LOFIC charge storage capacitors 40, 42. Optionally, the second reset transistor (RST2) 54 is also switched on, after first reset transistor 36, to reset output capacitor 50. Following these resets, select transistor 58 is switched on again during a noise readout period 84 to read out noise accumulated by detector element 26. Noise readout period 84 comprises a high-gain interval 86, followed by a medium-gain interval 88 and then a low-gain interval 80. While select transistor 58 is switched on, the charge on floating diffusion node 32 is first read out during high-gain interval 86. LOFIC transistors 44 and 46 are then switched on sequentially during medium-gain interval 88 and low-gain interval 90 to read out the charge remaining in LOFIC charge storage capacitors 40 and 42 to bitline 60.

CDS circuits (not shown) in logic die 24 subtract the noise signals read out during noise readout period 84 from the light signals read out during signal readout period 74 following exposure period 70 and thus reduce noise in the image sensor output signals. Switching on reset transistor (RST2) 54 following the second reset of the first reset transistor (RST1) 36 is useful particularly in reducing the contribution of fixed-pattern noise (FPN) in the output signals, whereas not switching the second reset transistor is useful in reducing random (kTC) noise.

FIG. 4 is a schematic circuit diagram showing details of a detector element 92, in accordance with an alternative embodiment of the invention. Detector element 92 is similar in design and operation to detector element 26 (FIG. 2) and may be used instead of detector elements 26 in image sensor 20 (FIG. 1). The components of detector element 92 are labeled with the same indicator numbers as the corresponding components of detector element 26. Detector element 92, however, comprises N-channel transistors 36, 44, 46, 48, 52, 54, 56, and 58, and photodiode 28 is an N-on-P photodiode. The polarities of supply voltage 94 and reset voltage 96 in detector element 26 are reversed relative to the voltages in FIG. 2.

Figure 5:
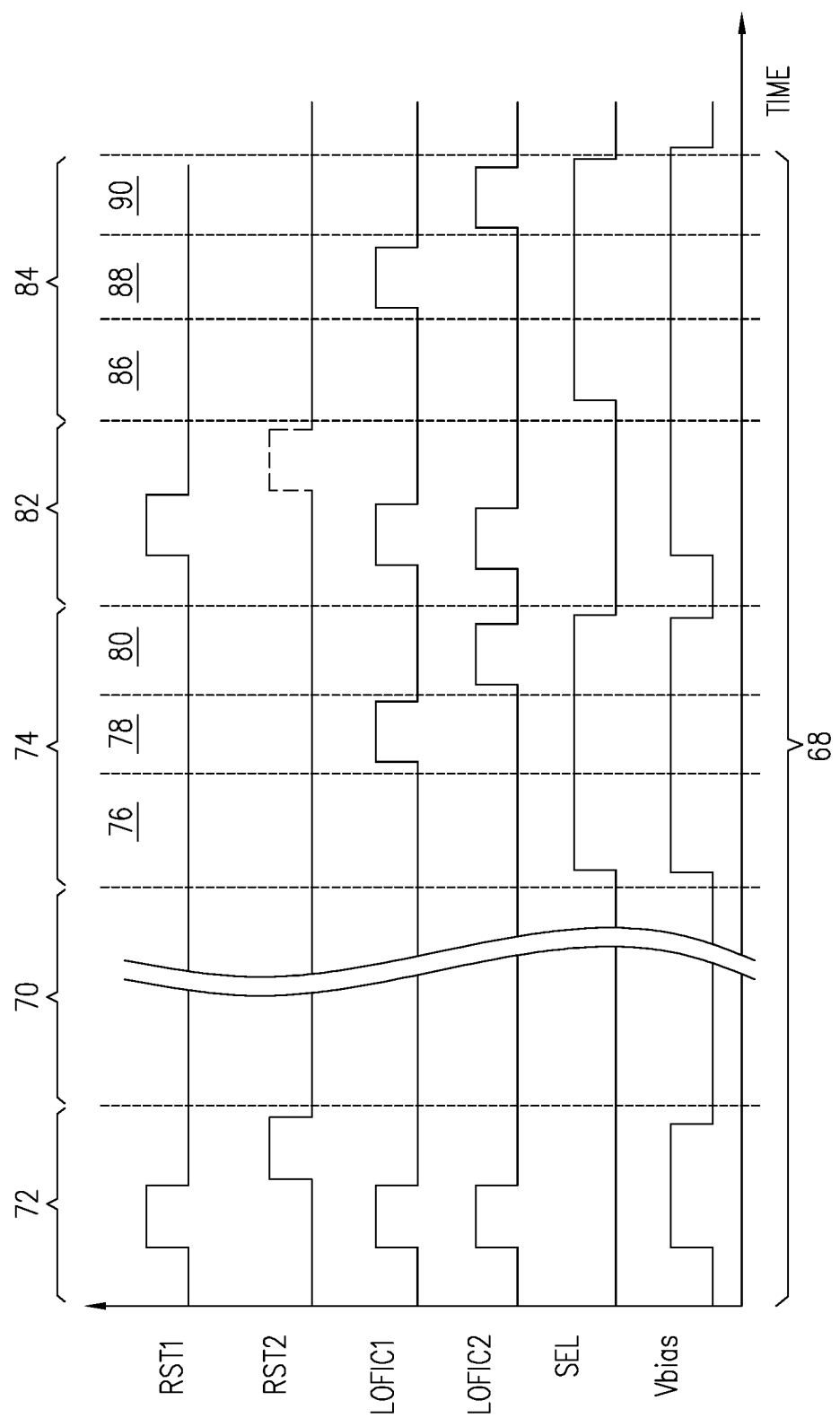
FIG. 5 is a timing diagram that schematically shows signals applied to the transistors of the detector element of FIG. 4, in accordance with an embodiment of the invention.

FIG. 5 is a timing diagram that schematically shows signals applied to the transistors of detector element 92 in the course of single image frame 68, in accordance with an embodiment of the invention. The polarities of the signals are reversed relative to those in FIG. 3, but otherwise the timing and operation of the circuits are similar. Frame 68 is divided into the same periods and intervals in FIG. 5 as in FIG. 3, and the same indicator numbers are used in FIG. 5 as in FIG. 3. Other than the reversal of polarity, the signals applied to the transistors in detector element 92 during frame 68, as shown in FIG. 5, are similar to those applied to the corresponding transistors in detector element 26, as described above.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An image sensor comprising:
   a logic die, comprising column readout circuits; and
   a sensor die, overlaid on the logic die and comprising bitlines connected to the column readout circuits and an array of detector elements, each detector element comprising:
      a photodiode having cathode and anode terminals;
      a floating diffusion node connected to one of the terminals of the photodiode;
      a first reset transistor coupled between the floating diffusion node and a reset voltage;
      a source follower transistor having an input connected to the floating diffusion node;
      an output capacitor having first and second terminals, with the first terminal connected to an output of the source follower transistor;
      a second reset transistor coupled between the second terminal of the output capacitor and the reset voltage; and
      a select transistor coupled between the second terminal of the output capacitor and one of the bitlines.

2. The image sensor according to claim 1, wherein each detector element comprises a bias transistor, coupled to apply a supply voltage to the first terminal of the output capacitor.

3. The image sensor according to claim 1, and comprising an additional source follower transistor coupled between the second terminal of the output capacitor and the select transistor in each detector element.

4. The image sensor according to claim 1, and comprising, in each detector element, a lateral overflow integration capacitor (LOFIC) circuit, comprising one or more charge storage capacitors and one or more LOFIC transistors coupled between the floating diffusion node and the charge storage capacitors, wherein the first reset transistor is coupled between the LOFIC circuit and the reset voltage.

5. The image sensor according to claim 4, wherein the LOFIC circuit comprises:
   a first charge storage capacitor having a first capacitance;
   a second charge storage capacitor having a second capacitance greater than the first capacitance;
   a first LOFIC transistor connected between the floating diffusion node and a first charge input terminal of the first charge storage capacitor; and
   a second LOFIC transistor connected between the first charge input terminal of the first charge storage capacitor and a second charge input terminal of the second charge storage capacitor.

6. The image sensor according to claim 5, wherein the first reset transistor is connected between the second charge input terminal of the second charge storage capacitor and the reset voltage.

7. The image sensor according to claim 5, wherein during readout of the detector element to the bitline, the first and second LOFIC transistors are switched on sequentially while the select transistor is switched on.

8. The image sensor according to claim 1, wherein during each image frame, in each detector element, the first reset transistor is switched on at a first reset time to reset the floating diffusion node prior to an exposure period of the frame,
   the select transistor is switched on at a first select time, following the exposure period, so as to read out photocharge from the floating diffusion node,
   the first reset transistor is switched on at a second reset time, following the first select time, to reset the floating diffusion node, and
   the select transistor is switched on at a second select time, following the second reset time, to read out noise accumulated by the detector element.

9. The image sensor according to claim 8, wherein the second reset transistor is switched on to reset the output capacitor between the first reset time and the first select time.

10. The image sensor according to claim 9, wherein the second reset transistor is switched on to reset the output capacitor between the second reset time and the second select time.

11. A method for image sensing, comprising:
providing a logic die, comprising column readout circuits; and
overlaying on the logic die a sensor die comprising an array of detector elements and bitlines, which connect to the column readout circuits on the logic die, each detector element comprising:
- a photodiode having cathode and anode terminals;
- a floating diffusion node connected to one of the terminals of the photodiode;
- a first reset transistor coupled between the floating diffusion node and a reset voltage;
- a source follower transistor having an input connected to the floating diffusion node;
- an output capacitor having first and second terminals, with the first terminal connected to an output of the source follower transistor;
- a second reset transistor coupled between the second terminal of the output capacitor and the reset voltage; and
- a select transistor coupled between the second terminal of the output capacitor and one of the bitlines.

12. The method according to claim 11, and comprising coupling a bias transistor in each detector element to apply a supply voltage to the first terminal of the output capacitor.

13. The method according to claim 11, and comprising coupling an additional source follower transistor between the second terminal of the output capacitor and the select transistor in each detector element.

14. The method according to claim 11, and comprising coupling a lateral overflow integration capacitor (LOFIC) circuit between the floating diffusion node and the first reset transistor in each detector element, the LOFIC circuit comprising one or more charge storage capacitors and one or more LOFIC transistors coupled between the floating diffusion node and the charge storage capacitors, and coupling the first reset transistor between the LOFIC circuit and the reset voltage.

15. The method according to claim 14, wherein the LOFIC circuit comprises:
- a first charge storage capacitor having a first capacitance;
- a second charge storage capacitor having a second capacitance greater than the first capacitance;
- a first LOFIC transistor connected between the floating diffusion node and a first charge input terminal of the first charge storage capacitor; and
- a second LOFIC transistor connected between the first charge input terminal of the first charge storage capacitor and a second charge input terminal of the second charge storage capacitor.

16. The method according to claim 15, wherein coupling the first reset transistor comprises connecting the first reset transistor between the second charge input terminal of the second charge storage capacitor and the reset voltage.

17. The method according to claim 15, and comprising during readout of the detector element to the bitline, switching on the first and second LOFIC transistors sequentially while the select transistor is switched on.

18. The method according to claim 11, and comprising, in each detector element during each image frame:
- switching on the first reset transistor at a first reset time to reset the floating diffusion node prior to an exposure period of the frame;
- switching on the select transistor at a first select time, following the exposure period, so as to read out photocharge from the floating diffusion node;
- switching on the first reset transistor at a second reset time, following the first select time, to reset the floating diffusion node; and
- switching on the select transistor at a second select time, following the second reset time, to read out noise accumulated by the detector element.

19. The method according to claim 18, and comprising switching on the second reset transistor to reset the output capacitor between the first reset time and the first select time.

20. The method according to claim 19, wherein the second reset transistor is switched on to reset the output capacitor between the second reset time and the second select time.

* * * * *